(12) United States Patent
Ndu et al.

(10) Patent No.: US 10,261,919 B2
(45) Date of Patent: Apr. 16, 2019

(54) SELECTIVE MEMORY ENCRYPTION

(71) Applicant: Hewlett Packard Enterprise Development LP, Houston, TX (US)

(72) Inventors: Geoffrey Ndu, Bristol (GB); Fraser John Dickin, Bristol (GB)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 392 days.

(21) Appl. No.: 15/205,326

(22) Filed: Jul. 8, 2016

(65) Prior Publication Data

US 2018/0011802 A1 Jan. 11, 2018

(51) Int. Cl.
*G09C 1/00* (2006.01)
*H04L 9/08* (2006.01)
(Continued)

(52) U.S. Cl.
CPC ...... *G06F 12/1408* (2013.01); *G06F 12/0891* (2013.01); *G06F 12/1466* (2013.01);
(Continued)

(58) Field of Classification Search
CPC ............ G06F 12/1408; G06F 12/0891; G06F 12/1466; G06F 21/604; G06F 9/45558;
(Continued)

(56) References Cited

U.S. PATENT DOCUMENTS 8,671,276 B2 3/2014 Bhogal et al.
8,751,830 B2 6/2014 Muff et al.
(Continued)

FOREIGN PATENT DOCUMENTS

WO WO-2015016918 A1 2/2015

OTHER PUBLICATIONS

X. Chen, R. P. Dick and A. Choudhary, "Operating System Controlled Processor—Memory Bus Encryption," 2008 Design, Automation and Test in Europe, Munich, 2008, pp. 1154-1159. (Year: 2008).*

(Continued)

*Primary Examiner* — Jung W Kim
*Assistant Examiner* — Sameera Wickramasuriya
(74) *Attorney, Agent, or Firm* — Hewlett Packard Enterprise Patent Department

(57) ABSTRACT

In one example in accordance with the present disclosure, a method may include receiving, by a processor on a system on a chip (SoC), a request to encrypt a subset of data accessed by a process. The method may also include receiving, at a page encryption hardware unit of the SoC, a system call from an operating system on behalf of the process, to generate an encrypted memory page corresponding to the subset of data. The method may also include generating, by the page encryption hardware unit, an encryption/decryption key for the first physical memory address. The encryption/decryption key may not be accessible by the operating system. The method may also include encrypting, by the page encryption hardware unit, the subset of data to the physical memory address using the encryption/decryption key and storing, by the page encryption hardware unit, the encryption/decryption key in a key store.

20 Claims, 4 Drawing Sheets

(51) Int. Cl.
*G06F 12/14* (2006.01)
*G06F 21/60* (2013.01)
*G06F 21/78* (2013.01)
*G06F 12/0891* (2016.01)

(52) U.S. Cl.
CPC ............ *G06F 21/602* (2013.01); *G06F 21/78* (2013.01); *G09C 1/00* (2013.01); *H04L 9/0894* (2013.01)

(58) Field of Classification Search
CPC ........ G06F 12/14; G06F 21/52; G06F 21/566; G06F 2009/45583; G06F 2009/45587; G06F 2221/034; G06F 2213/0038; H04L 9/0861
See application file for complete search history.

(56) References Cited

U.S. PATENT DOCUMENTS

| | | | |
|---|---|---|---|
| 2009/0132804 A1 | 5/2009 | Paul et al. | |
| 2011/0154061 A1* | 6/2011 | Chilukuri | G06F 12/1408 713/193 |
| 2013/0191651 A1* | 7/2013 | Muff | G06F 12/1027 713/193 |
| 2013/0297948 A1* | 11/2013 | Lee | G06F 21/602 713/193 |
| 2015/0089173 A1* | 3/2015 | Chhabra | G06F 12/1408 711/163 |
| 2015/0154424 A1* | 6/2015 | Mittal | G06F 12/1441 713/192 |
| 2015/0248357 A1* | 9/2015 | Kaplan | G06F 12/1408 713/193 |
| 2016/0092678 A1* | 3/2016 | Probert | G06F 9/45558 713/193 |
| 2016/0179702 A1* | 6/2016 | Chhabra | G06F 12/1408 713/193 |
| 2016/0335201 A1* | 11/2016 | Lea | G06F 12/1408 |
| 2016/0371496 A1* | 12/2016 | Sell | G06F 9/45558 |
| 2016/0378688 A1* | 12/2016 | Rozas | G06F 12/1408 713/190 |
| 2017/0054557 A1* | 2/2017 | Rozas | H04L 9/0891 |
| 2017/0132156 A1* | 5/2017 | Axnix | G06F 12/1408 |

OTHER PUBLICATIONS

C. Maaser and H. Baier, "A concept for monitoring self-transforming code using memory page access control management," 2011 Carnahan Conference on Security Technology, Barcelona, 2011, pp. 1-7. (Year: 2011).*

Kaplan, D., et al., "AMD Memory Encryption," White Paper, Advanced Micro Devices, Inc., Apr. 21, 2016, 12 pages.

Mahar, A.J. et al., "Design and Characterization of a Hardware Encryption Management Unit for Secure Computing Platforms," (Research Paper), Proceedings of the 29th Hawaii International Conference on System Sciences, 2006, 10 pages.

Massoudi, A. et al., "Secure and Low Cost Selective Encryption for Jpeg2000," (Research Paper), Multimedia, Jun. 30, 2008, Tenth IEEE International Symposium on, 8 pages.

* cited by examiner

SELECTIVE MEMORY ENCRYPTION

BACKGROUND

Physical attacks on bus and memory may be a major concern for users that do not control physical access to computer systems, such as, for example, in a cloud computing model.

BRIEF DESCRIPTION OF THE DRAWINGS

The following detailed description references the drawings, wherein.

DETAILED DESCRIPTION

Figure 1:
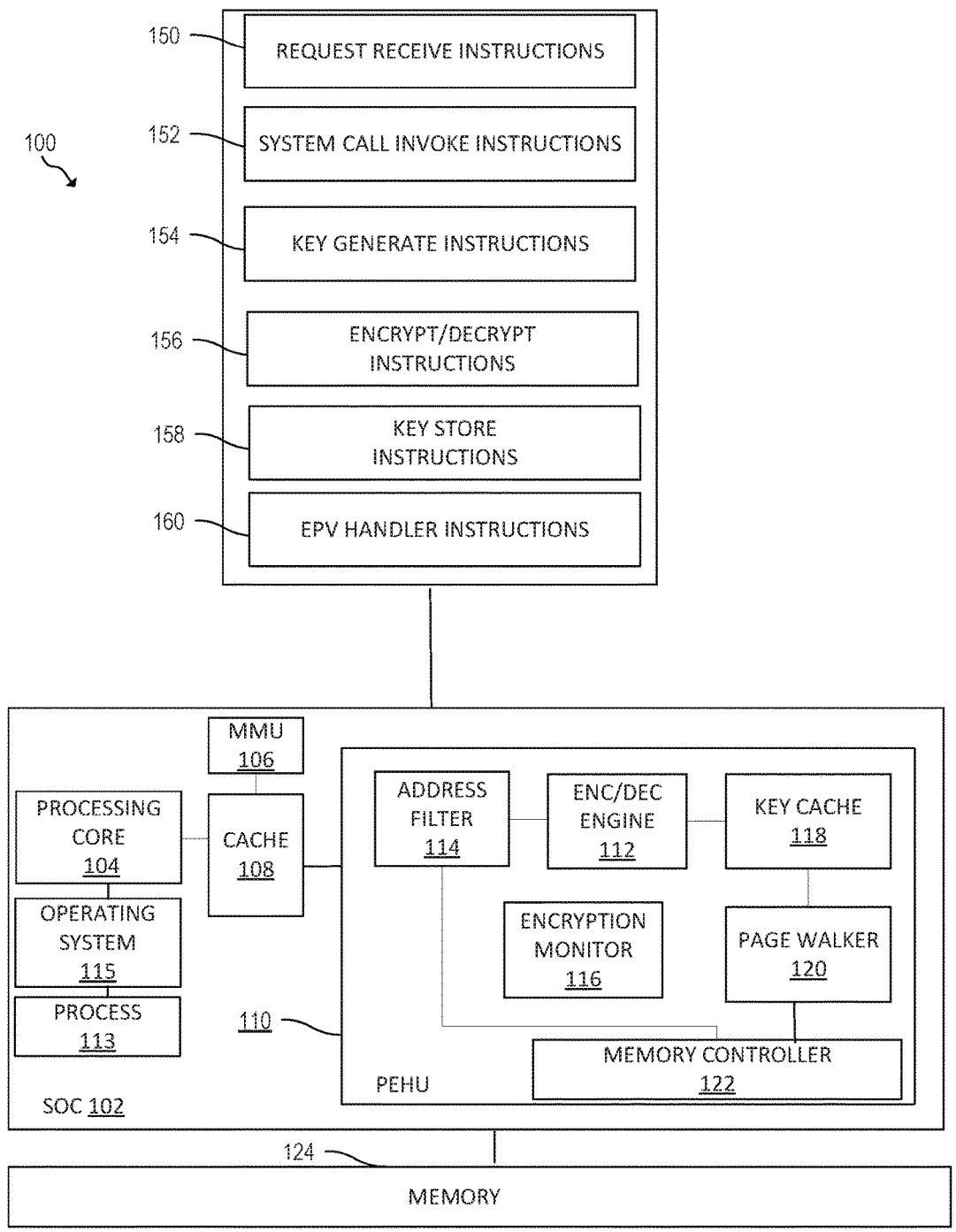
FIG. 1 is a block diagram of an example system for selective memory encryption.

In an environment where users do not control physical access to computer systems, physical attacks on bus and memory may be more likely. For example, in an externally controlled data center that facilitates cloud computing staff that have physical access to hardware, such as system administrators and security guards, may be able to install bus analysers to snoop on sensitive data in the fabric connecting the processor to the main memory. Such physical attacks may be disruptive to service and/or may have serious security implications for users of the computer systems.

Some systems may address this problem (where the OS of a system cannot be trusted) by treating the System-on-a-chip (SoC) as a security perimeter and encrypt all data leaving the SoC (the security perimeter) to prevent unauthorized access. This ensures that if the operating system is vulnerable, it may not have access to plain text data being communicated via the SoC to an application or other entity. However, such widespread encryption may cause a significant computational overhead and also encrypt data which may not be sensitive. Accordingly, it may be technically challenging to safeguard data from a vulnerable operating system by encrypting data which is secure without incurring excess computational resources by encrypting data that is not secure.

This disclosure provides a technical solution to that challenge by using a hardware-software approach to memory encryption that transparently and selectively encrypts data that is deemed sensitive without allowing that data to be seen in plaintext by the operating system. Hence, non-sensitive data may not incur encryption overhead. SME may assume that the main memory is non-volatile. Systems and methods for selective memory page encryption (SME) may protect sensitive data from physical attacks outside the SoC by transparently and selectively encrypting OS (Operating System) pages before they leave the SoC security perimeter. Once a page is selected for encryption, any data written to that page may be encrypted automatically.

SME encrypts pages selectively as not every page may be sensitive. Non-sensitive pages may not require encryption. This allows encrypted and ordinary pages/processes to co-exist in memory. SME may automatically encrypt sensitive pages, using a hardware encryption engine, without the active intervention of a process (such as an application) or an Operating System (OS). As used herein, the term Operating System (OS) may refer to any combination of hardware and software that manages system resources. Systems and methods for SME may rely on the OS to provide some basic functionality such as the set-up and tear-down of encrypted pages but such reliance does not compromise security. In this manner, if the OS becomes compromised, it cannot access the plaintext version of the secure data. Instead, a compromised OS can lead to denial of set-up and tear-down of encrypted pages. For example, the OS may be used to create encrypted pages but cannot access the plaintext version of the data on those encrypted pages. If the OS becomes compromised, the encrypted pages may be created, but the OS cannot access the plaintext version of the secure data.

An example method for selective memory encryption may include receiving, by a processor on a system on a chip (SoC), a request to encrypt a subset of data accessed by a process, wherein the subset of data is not accessible by an operating system and receiving, at a page encryption hardware unit of the SoC, a system call from an operating system on behalf of the process, to generate an encrypted memory page corresponding to the subset of data, wherein the system call includes a first physical memory address, a virtual address, and a size of the virtual address. The method may also include generating, by the page encryption hardware unit, an encryption/decryption key for the first physical memory address, wherein the encryption/decryption key is not accessible by the operating system and encrypting, by the page encryption hardware unit, the subset of data to the physical memory address using the encryption/decryption key. The method may also include storing, by the page encryption hardware unit, the encryption/decryption key in a key store, wherein the key store maps a plurality of encryption keys to a plurality of physical memory addresses including the first physical memory address.

FIG. 1 is a block diagram of an example system 100 including a system on a chip (SOC) 102 enabled with selective memory encryption (SME). SOC 102 may include at least one processing core 104 that may include a Central Processing Unit (CPU) or another suitable hardware processor. The processing core 104 may have the capability to enter a secure mode. SOC 102 may include a memory management unit (MMU) 106 used for managing memory in SOC 102. For example, MMU 106 may translate virtual memory addresses to physical memory addresses and/or vice versa. Processing core 104 and MMU 106 may have access to a cache 108 of memory integrated into the SOC 102. Cache 108 may include a variety of caches, such as a last level cache. Cache 108 may also be accessed by Page Encryption Hardware Unit (PEHU) 110.

PEHU 110, logically sits between the Last Level Cache (LLC) and the integrated memory controller 122. PEHU 110 may route read and write transactions between LLC and the integrated memory controller 122.

Page Encryption Hardware Unit 110 may be a hardware unit and may include encryption/decryption engine 112 and address filter 114. The encrypt/decrypt engine 112 is a hardware unit that encrypts and decrypts selected pages to and from the main memory (which may or may not be volatile). Once a page is selected for encryption, any data written to that page may be encrypted. Various cryptographic primitives for encryption may be used in different implementations. For example, Advanced Encryption Standard (AES) CTR mode may be used if confidentiality is the high priority design requirement and AES GCM mode may be used when authentication and confidentiality are high priorities.

Address Filter 114 may route cache lines to the encryption/decryption engine responsive to a determination that the data and/or cache line is marked as encrypted. A cache tag may be an identifier for data, such as the data in the cache. Cache tags may be enhanced with an encryption bit, which denotes that a cache line belongs to an encrypted page. Address filter 114 may route ordinary cache lines to the memory controller without encryption overhead. Address Filter 114 may route read and write transactions between a last level cache and an integrated memory controller, wherein the page encryption hardware unit includes the hardware encryption/decryption unit and an address filter.

PEHU 110 may provide for the long-term storage of encryption/decryption keys in a key store, which may be a secure, separate memory and/or part of the main memory. The key store may comprise a set of page tables that map physical memory addresses to encryption keys. The key store may also contain metadata such as Address Space (ASID), permission bits, etc. Physical memory addresses may be split into equal-sized memory regions called key regions. The size of a key region may be no greater than the smallest supported OS page size. However, multiple pages could be made to map to a single key region to reduce the resources required to implement selective memory encryption. For example, a processor supporting 4 KB, 8 KB and 12 KB pages could have 4 KB key regions. The key store may be managed by encryption monitor 116. The key store may be protected by encryption and integrity checks when part of the main memory. A key cache 118 may supply keys to the key store. The key store may not be accessible by OS 115.

PEHU 110 may include an encryption monitor 116 that comprises a software component for managing encryption keys. To protect the system 100 from a compromised operating system (OS), the encryption monitor 116 may run as a trusted software at the high privilege level, such as the highest privilege level available in SOC 102. For example, encryption monitor 116 may run at EL3 in ARM® or Machine Level in RISC-V. For processors that have secure and non-secure states, the encryption monitor 116 may run in the secure state. The encryption monitor 116 may, for example, run in a higher privilege mode than the Operating System 115 of the SOC 102. In this manner, the encryption monitor 116 may prevent tampering by the OS 115 and/or other processes.

Encryption monitor 116 may perform integrity checks using the metadata associated with each key region. The key cache 118 may be similar to a translation lookaside buffer (TLB) but caches physical memory address to encryption key mappings. A TLB is a memory cache for storing translations of virtual memory to physical memory.

The encryption monitor 116 is responsible for managing encryption keys and may be invoked whenever an encrypted page is created/destroyed or a key is absent in the encryption key page table. The encryption monitor 116 may encrypt the encryption keys to ensure confidentiality. This may be important if the key store is stored in a portion of the main memory.

Depending on the set-up of the key store, the encryption monitor 116 may also need to maintain the integrity of the key store with a Merkle tree or other hash tree. The root of the tree (plus other secrets) could be stored in a secure non-volatile device such as a Trusted Platform Module (TPM). The specific mechanism/scheme for protecting the key store may be implementation dependent.

The encryption monitor 116 may be invoked, via exception, when integrity checks fail. The exact information available from the metadata and the types of checks possible may be implementation dependent. Metadata checks may be used to implement sophisticated access control mechanisms. On a key cache miss, the page walker 120 may walk the tables in the key store, identify and fetch the right keys and fill the key cache 118. The page walker 120 may invoke the encryption monitor 116 if keys for a particular region are absent. This allows the security manager to generate keys on the fly, for example, using key derivation functions. In some aspects, the page walker may be a Finite State Machine (FSM), software managed system, etc. The page walker 120 may invoke the encryption monitor 116 to decrypt keys each time a key is fetched from the key store. The encryption/decryption engine 112 could be reused for decrypting the keys.

In some aspects, system 100 may not include the page walker 120 and the key store. These aspects may include a key cache 118 that is large enough to store the mappings for all the memory regions. The key cache 118 may need to be written to secure storage during system resets.

PEHU 110 may also include a memory controller 122 for interfacing with memory 124. Memory 124 may include any volatile memory, non-volatile memory, or any suitable combination of volatile and non-volatile memory. Memory 124 may comprise Random Access Memory (RAM), Read-Only Memory (ROM), flash memory, and/or other suitable memory. Memory 124 may also include a random access non-volatile memory that can retain content when the power is off. Memory 124 may be used by system 100 for storing data, such as encrypted data.

In the example illustrated in FIG. 1, system 100 may fetch, decode, and execute instructions 150, 152, 154, 156, 158 and 160. With respect to the executable instruction representations (e.g., boxes) described and shown herein, it should be understood that part or all of the executable instructions and/or electronic circuits included within one box may be included in a different box shown in the figures or in a different box not shown.

A process 113, executing on SOC 102, may make a determination that certain data is to be encrypted. The data may include a page or series of pages to be encrypted. Once a page is selected for encryption, any data written to that pages may be encrypted. The process may execute in a secure mode of the processing core 104. The process 113 may determine, for example, that all of or a subset of data handled by the process 113 is secure and should be encrypted. The subset of data may be accessible to processes running in the secure state. The process may determine which data is secure in a variety of ways. For example, data of a certain type may be considered secure, data entered by certain individuals, data intended for certain recipients, etc. Process 113 may generate a request to encrypt data and transmit the request to Operating System (OS) 115. Importantly, the request to encrypt data may indicate a subset of a total amount of data handled by the process. The remainder of the total data handled by the process may not be encrypted.

Request receive instructions 150, when executed, may cause system 100 to receive, by a processing core 104 on a SoC 102, a request to encrypt all or a subset of data (e.g. pages) accessed by a process 113. The plaintext version of the subset of data may not be accessible by OS 115. The OS 115, upon receiving this call, may allocate but not necessarily load enough physical pages to back up the required encrypted virtual address range. In other words, the call may be made on behalf of the process 113 by the operating system 115. The parameters of the system call could include such information as the range of future, encrypted virtual memory pages.

The call may invoke the encryption monitor 116 which then sets up the encryptions keys for the required physical pages. The exact mechanism for generating the keys may be implementation dependent and could range from simple schemes (e.g. using a true random number generator to generate keys) to complex schemes (e.g. remote key provisioning encryption key set up where the encryption monitor writes the encryption keys to the key store and marks them as valid so that it can be used by the hardware encryption unit). The encryption monitor may update an Encrypted Page Vector (EPV) (described in further detail below) after checking that the requested address range is not currently encrypted. The create instructions may fail if any of the requested pages are currently encrypted. A write to the allocated pages may trigger a cache/TLB miss and on refill the encryption bits may be updated from the EPV. The OS 115 may decide to allocate encrypted virtual pages over non-contiguous physical pages by splitting up the address range and executing the create instructions multiple times.

For example, system call invoke instructions 152, when executed, may cause system 100 to receive, at a page encryption hardware unit 110 of the SoC 102, a system call from an OS 115 on behalf of the process 113, to generate an encrypted memory page corresponding to data. The system call may include a physical memory address, a virtual address, and a size of the virtual address.

Key generate instructions 154, when executed, may cause system 100 to generate, by the page encryption hardware unit 110, an encryption/decryption key for the first physical memory address. The encryption/decryption key may not be accessible by the OS 115. Key generate instructions 154, may be performed by the encryption monitor 116. Encrypt/Decrypt instructions 156, when executed, may cause system 100 to encrypt, via the encryption/decryption engine 112 of the page encryption hardware unit 110, the data to the physical memory address using the encryption/decryption key. Encrypt/Decrypt instructions 156, when executed, may cause system 100 to decrypt, via the encryption/decryption engine 112 of the page encryption hardware unit 110, the data from the physical memory address using the encryption/decryption key. Key store instructions 158, when executed, may cause system 100 to store, by page encryption hardware unit 110, the encryption/decryption key in a key store. As discussed above, the key store may map a plurality of encryption keys to a plurality of physical memory addresses including the first physical memory address. Key store instructions 158 may be performed by encryption monitor 116.

EPV handler instructions 160, when executed, may cause system 100 to generate an encrypted page vector (EPV) that includes a vector with one bit for each physical OS page in the system indicating whether the OS page is encrypted or not. The encrypted page vector may be stored in a memory, such as a memory included on SoC 102 inaccessible to the operating system 115. The EPV is a data structure that may be used to facilitate the dynamic creation of encrypted pages. A translation lookaside buffer (TLB) is a memory cache for storing translations of virtual memory to physical memory. The EPV may be cached in the TLB and use cache tags as the Encryption bit (EBit). In some aspects, the EPV may be encoded to reduce its size. At least one of the EPV handler instructions 160 may be performed by encryption monitor 116.

EPV handler instructions 160, when executed, may also cause system 100 to determine that first physical memory address is not encrypted and update, by the encryption monitor 116, the encrypted page vector to indicate that the physical memory address is not encrypted.

EPV handler instructions 160, when executed, may also cause the page encryption hardware unit 110 to (1) receive a request, from the operating system 115, to transfer the first encrypted physical page to secondary storage; (2) save a first physical memory address and a first encryption/decryption key associated with the first encrypted page to memory (3) clear a first entry corresponding to the first physical memory address in the encrypted page vector; and (4) copy first encrypted data corresponding to the first physical memory address from the memory to the secondary storage.

In this manner, the EPV handler instructions 160 may be used to swap an encrypted physical page to secondary storage. The TLB entry for page may be invalidated and the encryption monitor 116 may save the address of the physical page with its associated keys to memory and then invalidates the entry for the physical page in the key store and the EPV. The page may be measured using a cryptographic hash function such as SHA256 to mitigate against tampering in the secondary storage.

EPV handler instructions 160, when executed, may also cause page encryption engine 110 to (1) receive a request, from the operating system 115, to transfer a second encrypted physical page in secondary storage to memory; (2) determine that a present measurement of the second physical page matches a stored measurement of the second page; (3) restore a second encryption/decryption key associated with the second encrypted physical page to the key store; and (4) enter a second entry corresponding to the second physical memory address into the encrypted page vector.

In this manner, the instructions may be used to load a page swapped out (as discussed above). First, the integrity of the page may be checked by comparing the present and stored measurements of the page. If the measurements match, the encryption monitor may restore the keys associated with the address. Otherwise, the swap may be disallowed. The EPV may also be modified to make pages valid again.

EPV handler instructions 160, when executed, may also cause page encryption hardware unit to (1) receive a request from operating system 115 to delete an encrypted page, wherein the request includes a second physical memory address and a page identification corresponding to the encrypted page; (2) invalidate, by the encryption monitor, a key associated with the encrypted page in the key store; (3) clear, by the encryption monitor, an entry corresponding to the second physical memory address in the encrypted page vector; and (4) erase the encrypted page from memory.

In this manner, the instructions may be used to request the tear-down of encrypted pages. The keys associated with the physical page in the key store may be torn down. The encryption bit associated with the page in the EPV may be cleared and the encrypted page may be completely erased to avoid data leaks. Some of these instructions may be used to support the passing of secret user data to the encryption monitor. Public key encryption could be used to protect such data from the OS 115. For example, the original system call (i.e. as discussed above in reference to system call invoke instructions 152) could have a fourth argument which points to the location of the keys that a processes wants used for encryption.

Some aspects of system 100 may not use the EPV. Instead, the physical pages may be statically portioned into encrypted and ordinary pages at system reset using firmware. There a number of ways of this could be implemented. The TLB can be modified so that firmware can set the encryption bits for an address range. The address filter can also be made programmable by firmware such that addresses ranges are considered encrypted. An extra bit may be added to the key store metadata to distinguish absent and present pages, similar to the OS page tables described above.

In some aspects, a System on a Chip with an ARM® architecture may be extended with SME. For example, the ARM® architecture may incorporate the following features: a secure and a non-secure state, each with an associated physical memory address space, TrustZone® compliant SoC with TrustZone® aware fabric and IP blocks, Support for exception levels EL0 to EL3 and Instruction set support for cryptographic primitives (e.g. AES and SHA2-256). To support SME, the SoC 102 may be extended with the PEHU 110. TLB and caches may be enhanced to support EPV and encryption bit. The EPV may be stored in secure memory. Secure memory could be on-chip SRAM/eDRAM, a secure partition of main memory or even a separate, external memory. The location of the key store, like EPV, could be in a separate (on-chip) memory or secure part of the main memory. The encryption monitor may run as a trusted application at the highest secure security state, EL3. Privileged SME instructions may be available in EL1 and EL2 and in the secure and non-secure states. This allows secure and non-secure applications as well as OSs to request encrypted pages. The encryption monitor may use cryptographic instructions to speed up encryption and integrity checking of keys in the key store. To keep the size of the key store and other SPE data structures manageable, multiple OS pages may map to a single key region.

In some aspects the computer system 100 may include a media controller that encrypts all data before storing them in the memory media. Therefore, every read and write transaction, irrespective of sensitivity, may incur additional encryption overhead. Since not every data may be sensitive, the SPE encrypt bit which is exported to the memory controller could be used to enable selective encryption in the media controller. Accordingly, the media controller may encrypt those transactions where the encryption bit is not set. Data in transit and data at rest could be decoupled by enhancing EPV with an extra bit denoting if a page needs data at rest protection provided by the media controller. The media controller may be external to SoC 102. In other words, if a system comprises a memory controller that encrypts all data stored on a storage media, the system 100 may determine, using the value of an encryption bit, whether a first data is encrypted; and encrypt, by the memory controller, the first data if the encryption bit indicates that the first data is not encrypted. For example, the page encryption hardware unit 110 may mark a value of an encryption bit to indicate whether a first data is encrypted. The memory controller may encrypt each data stored on a storage media managed by the memory controller, determine whether a first data is encrypted using the value of the encryption bit and encrypt the first data responsive to a determination that the encryption bit indicates that the first data is not encrypted.

The media controller may be capable of performing simple atomic operations on behalf of processes. These atomic operations may be implemented as load-link and store-conditional (LL/SC) pairs. Load-link may return the current value of a memory location, while a subsequent store-conditional to the same memory location may store a new value if no updates have occurred to that location since the load-link. An LL/SC atomic may not directly depend on data values so will not be affected by SME.

The media controller may also include Memory Side Acceleration (MSA). MSA refers to processing-in-memory which adds computational resources to memory allowing computation to occur inside the memory where data reside. This may leads to improved performance and reduced energy consumption. SME may actually improve security for systems with MSA. For example, if an MSA operation maliciously makes a copy of an encrypted page, the page may be unreadable as the encryption key in the SME and the page's physical memory address will no longer match. The page may be effectively erased cryptographically.

Figure 2:
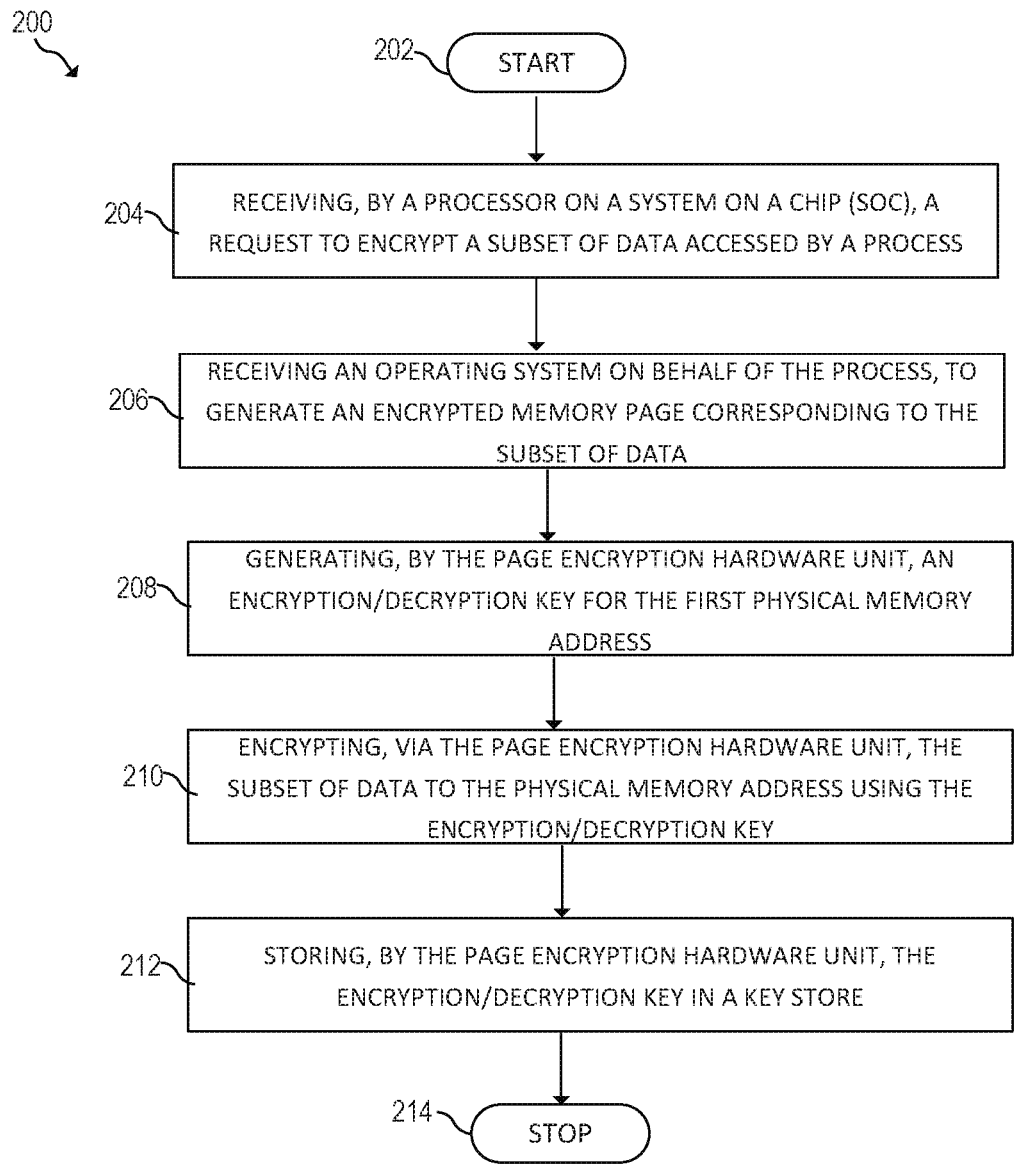
FIG. 2 is a flowchart of an example method for selective memory encryption.

FIG. 2 is a flowchart of an example method 200 for selective memory encryption. Method 200 may be described below as being executed or performed by a system, for example, system 100 of FIG. 1, system 300 of FIG. 3 or system 400 of FIG. 4. Other suitable systems and/or computing devices may be used as well. Method 200 may be implemented in the form of executable instructions stored on at least one machine-readable storage medium of the system and executed by at least one processor of the system. The processor may include a Central Processing Unit (CPU) or another suitable hardware processor. The machine-readable storage medium may be non-transitory. Method 200 may be implemented in the form of electronic circuitry (e.g., hardware). At least one block of method 200 may be executed substantially concurrently or in a different order than shown in FIG. 2. Method 200 may include more or less blocks than are shown in FIG. 2. Some of the blocks of method 200 may, at certain times, be ongoing and/or may repeat.

Method 200 may start at block 202 and continue to block 204, where the method may include receiving, by a processor on a system on a chip (SoC), a request to encrypt a subset of data accessed by a process. The plaintext version of the subset of data may not be accessible by an operating system. The data may include a page or series of pages to be encrypted. Once a page is selected for encryption, any data written to that pages may be encrypted. At block 206, the method may include receiving, at a page encryption hardware unit of the SoC, a system call from an operating system on behalf of the process, to generate an encrypted memory page corresponding to the subset of data. The system call may include a physical memory address, a virtual address, and a size of the virtual address. The physical memory address may be divided into key regions, wherein each key region is associated with at least one encryption/decryption key. The size of each key region may be no greater than the smallest supported page size.

At block 208, the method may include generating, by the page encryption hardware unit, an encryption/decryption key for the first physical memory address. The encryption/decryption key may not be accessible by the operating system. The processor and the page encryption hardware unit may be included in a system on a chip.

At block 210, the method may include encrypting, by the page encryption hardware unit, the subset data to the physical memory address using the encryption/decryption key. The key store may be stored on a non-volatile memory. At block 212, the method may include storing, by the page encryption hardware unit, the encryption/decryption key in a key store, wherein the key store maps a plurality of encryption keys to a plurality of physical memory addresses including the first physical memory address. Method 200 may eventually continue to block 214, where method 200 may stop.

Figure 3:
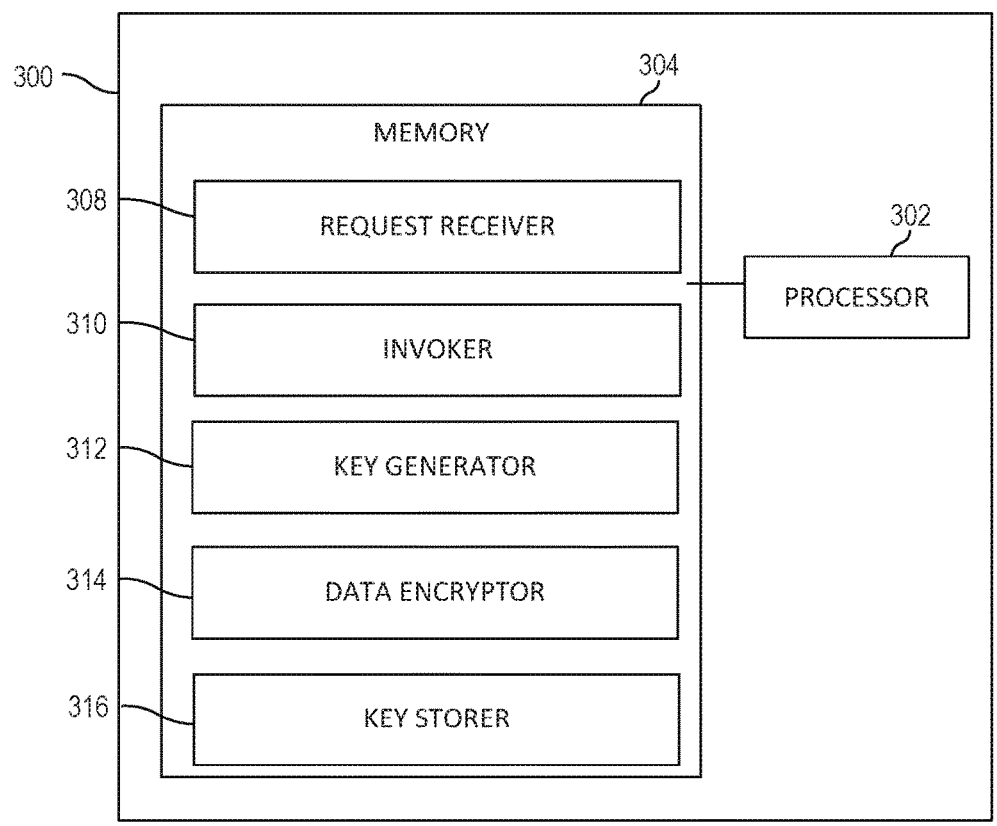
FIG. 3 is a block diagram of an example system for selective memory encryption.

FIG. 3 is a block diagram of an example system 300 for selective memory encryption. System 300 may include a processor 302 and a memory 304 that may be coupled to each other through a communication link (e.g., a bus). Processor 302 may include a Central Processing Unit (CPU) or another suitable hardware processor. In some examples, memory 304 stores machine readable instructions executed by processor 302 for operating system 300. Memory 304 may include any suitable combination of volatile and/or non-volatile memory, such as combinations of Random Access Memory (RAM), Read-Only Memory (ROM), flash memory, and/or other suitable memory.

Memory 304 stores instructions to be executed by processor 302 including instructions for a request receiver 308, an invoker 310, a key generator 312, a data encryptor 314 and a key storer 316. The components of system 300 may be implemented in the form of executable instructions stored on at least one machine-readable storage medium of system 300 and executed by at least one processor of system 300. The machine-readable storage medium may be non-transitory. Each of the components of system 300 may be implemented in the form of at least one hardware device including electronic circuitry for implementing the functionality of the component.

Processor 302 may execute instructions of request receiver 308 to receive, by a processor, a request to encrypt data. The operating system may manage resources of the system and execute at a first privilege level. The first privilege level may not have access to a plaintext version of the data. The data may include a page or series of pages to be encrypted. Once a page is selected for encryption, any data written to that pages may be encrypted. Processor 302 may execute instructions of invoker 310 to receive at a page encryption hardware unit, a system call from an operating system on behalf of the application, to invoke the page encryption hardware unit to generate an encrypted memory page corresponding to the data. The page encryption hardware unit may run at a second privilege level that has more privileges than the first privilege level. For example, the second privilege level may have access to the data. The system call may include a physical memory address, a virtual address, and a size of the virtual address. The physical memory address may be divided into key regions, wherein each key region is associated with at least one encryption/decryption key. The size of each key region may be no greater than the smallest supported page size. The processor and the page encryption hardware unit may be included in a system on a chip.

Processor 302 may execute instructions of a key generator 312 to generate, by the page encryption hardware unit, an encryption/decryption key for the first physical memory address. The encryption/decryption key may be accessible by the second privilege level and may not be accessible by the first privilege level. The processor may have a secure and a non-secure state. The second privilege level may be the secure state and the first privilege level may be the non-secure state.

Processor 302 may execute instructions of data encryptor 314 to cause, by the page encryption hardware unit, the encrypted memory page to store on a memory. Processor 302 may execute instructions of key storer 316 to store, by page encryption hardware unit, the encryption/decryption key in a key store. The key store may map a plurality of encryption keys to a plurality of physical memory addresses including the first physical memory address. The key store may be stored on a non-volatile memory.

Figure 4:
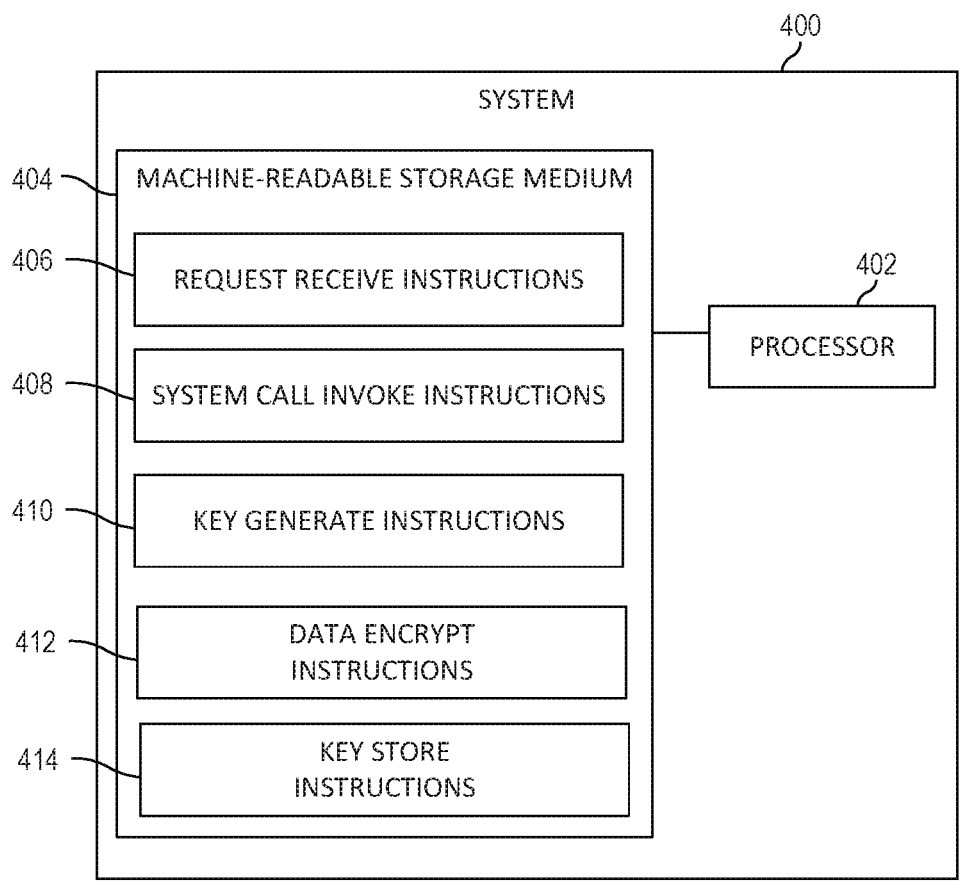
FIG. 4 is a block diagram of an example system for selective memory encryption.

FIG. 4 is a block diagram of an example system 400 for selective memory encryption. System 400 may be similar to system 100 of FIG. 1, for example. In the example illustrated in FIG. 4, system 400 includes a processor 402 and a machine-readable storage medium 404. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 402 may be at least one central processing unit (CPU), microprocessor, and/or other hardware devices suitable for retrieval and execution of instructions stored in machine-readable storage medium 404. In the example illustrated in FIG. 4, processor 402 may fetch, decode, and execute instructions 406, 408, 410, 412 and 414 to perform selective memory encryption. Processor 402 may include at least one electronic circuit comprising a number of electronic components for performing the functionality of at least one of the instructions in machine-readable storage medium 404. With respect to the executable instruction representations (e.g., boxes) described and shown herein, it should be understood that part or all of the executable instructions and/or electronic circuits included within one box may be included in a different box shown in the figures or in a different box not shown.

Machine-readable storage medium 404 may be any electronic, magnetic, optical, or other physical storage device that stores executable instructions. Thus, machine-readable storage medium 404 may be, for example, Random Access Memory (RAM), an Electrically-Erasable Programmable Read-Only Memory (EEPROM), a storage drive, an optical disc, and the like. Machine-readable storage medium 404 may be disposed within system 400, as shown in FIG. 4. In this situation, the executable instructions may be "installed" on the system 400. Machine-readable storage medium 404 may be a portable, external or remote storage medium, for example, that allows system 400 to download the instructions from the portable/external/remote storage medium. In this situation, the executable instructions may be part of an "installation package". As described herein, machine-readable storage medium 404 may be encoded with executable instructions for context aware data backup. The machine-readable storage medium may be non-transitory.

Referring to FIG. 4, request receive instructions 406, when executed by a processor (e.g., 402), may cause system 400 to receive a request to encrypt a subset of data accessed by an application. The plaintext version of the subset of data may not be accessible by an operating system. System call invoke instructions 408, when executed by a processor (e.g., 402), may cause system 400 to receive a system call from an operating system, on behalf of the application, to generate an encrypted memory page corresponding to the subset of data. The system call may include a physical address, a virtual address, and a size of the virtual address. The physical memory address may be divided into key regions, wherein each key region is associated with at least one encryption/decryption key. The size of each key region may be no greater than the smallest supported page size.

Key generate instructions 410, when executed by a processor (e.g., 402), may cause system 400 to generate, by the page encryption hardware unit, an encryption/decryption key for the first physical address. The encryption/decryption key is not accessible by the operating system. The processor and the page encryption hardware unit may be included in a system on a chip.

Data encrypt instructions 412, when executed by a processor (e.g., 402), may cause system 400 encrypt, by the page encryption hardware unit, the subset of data to the physical address using the encryption/decryption key. Key store instructions 414, when executed by a processor (e.g., 402), may cause system 400 to store, by the page encryption hardware unit, the encryption/decryption key in a key store. The key store may map a plurality of encryption keys to a plurality of physical addresses including the first physical address. The key store may be stored on a non-volatile memory.

The foregoing disclosure describes a number of examples for selective memory encryption. The disclosed examples may include systems, devices, computer-readable storage media, and methods for selective memory encryption. For purposes of explanation, certain examples are described with reference to the components illustrated in FIGS. 1-4. The functionality of the illustrated components may overlap, however, and may be present in a fewer or greater number of elements and components. Further, all or part of the functionality of illustrated elements may co-exist or be distributed among several geographically dispersed locations. Further, the disclosed examples may be implemented in various environments and are not limited to the illustrated examples.

Further, the sequence of operations described in connection with FIGS. 1-4 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples.

The invention claimed is:

1. A method comprising:
    receiving, by a processor on a system on a chip (SoC), a request to encrypt a subset of data accessed by a process, wherein a plaintext version of the subset of data is not accessible by an operating system;
    receiving, at a page encryption hardware unit of the SoC, a system call from the operating system on behalf of the process, to generate an encrypted memory page corresponding to the subset of data, wherein the system call includes a first physical memory address, a virtual address, and a size of the virtual address;
    generating, by the page encryption hardware unit, an encryption/decryption key for the first physical memory address, wherein the encryption/decryption key is not accessible by the operating system;
    encrypting, by the page encryption hardware unit, the subset of data to the physical memory address using the encryption/decryption key; and
    storing, by the page encryption hardware unit, the encryption/decryption key in a key store, wherein the key store maps a plurality of encryption keys to a plurality of physical memory addresses including the first physical memory address.

2. The method of claim 1, comprising:
    dividing, the physical memory address, into key regions, wherein each key region is associated with at least one encryption/decryption key.

3. The method of claim 1, comprising:
    routing, by an address filter of the page encryption hardware unit, read and write transactions between a last level cache and an integrated memory controller.

4. The method of claim 1, wherein the page encryption hardware unit runs at a privilege level higher than the operating system.

5. The method of claim 1, wherein the processor has a secure and a non-secure state and a software component of the page encryption hardware unit runs in the secure state.

6. The method of claim 5, wherein the subset of data is accessible to processes running in the secure state.

7. The method of claim 2, wherein the size of each key region is no greater than a smallest supported page size.

8. The method of claim 1, comprising:
    routing, by the page encryption hardware unit, a cache line to a encryption/decryption engine responsive to a determination that data is marked as encrypted.

9. The method of claim 1, comprising:
    marking, by the page encryption hardware unit, a value of an encryption bit to indicate whether a first data is encrypted;
    encrypting, by a memory controller external to the SoC, each data stored on a storage media managed by the memory controller;
    determining by the memory controller, whether the first data is encrypted using the value of the encryption bit; and
    encrypting, by the memory controller, the first data responsive to a determination that the encryption bit indicates that the first data is not encrypted.

10. The method of claim 1, comprising:
    generating an encrypted page vector that includes a vector with one bit for each physical OS page in the system indicating whether the OS page is encrypted or not and the encrypted page vector is stored in a part of memory inaccessible to the operating system.

11. The method of claim 10, comprising:
    determining, by the page encryption hardware unit, that the first physical memory address is not encrypted; and
    updating, by the page encryption hardware unit, the encrypted page vector to indicate that the physical memory address is not encrypted.

12. The method of claim 10, wherein the encrypted page vector and the key store are stored in a memory that is not accessible by the operating system.

13. The method of claim 12, comprising:
    receive, by the page encryption hardware unit, a request, from the operating system, to transfer the first encrypted physical page to a secondary storage;
    saving, by the page encryption hardware unit, the first physical memory address and a first encryption/decryption key associated with the first encrypted page to memory;
    clearing, by the page encryption hardware unit, a first entry corresponding to the physical address in the encrypted page vector; and
    copying, by the page encryption hardware unit, first encrypted data corresponding to the first physical memory address from the memory to the secondary storage.

14. The method of claim 13, comprising:
    receive, by the page encryption hardware unit, a request, from the operating system, to transfer a second encrypted physical page in secondary storage to memory;

determining, by the page encryption hardware unit, that a present measurement of the second physical page matches a stored measurement of the second page;

restoring, by the page encryption hardware unit, a second encryption/decryption key associated with the second encrypted physical page to the key store; and entering, by the page encryption hardware unit, a second entry corresponding to the second physical memory address into the encrypted page vector.

15. The method of claim 12, comprising:

receive, by the page encryption hardware unit, a request, from the operating system, to delete an encrypted page, wherein the request includes a second physical memory address and a page identification corresponding to the encrypted page;

invalidating, by the page encryption hardware unit, a key associated with the encrypted page in the key store; and clearing, by the page encryption hardware unit, an entry corresponding to the second physical memory address in the encrypted page vector.

16. A system for selective memory encryption comprising:

a request receiver to receive, by a processor, a request to encrypt data, wherein an operating system manages resources of the system and executes at a first privilege level that cannot access a plaintext version of the data;

an invoker to receive at a page encryption hardware unit, a system call from the operating system, to invoke the page encryption hardware unit to generate an encrypted memory page corresponding to the data, wherein the system call includes a first physical memory address, a virtual address, and a size of the virtual address and wherein the page encryption hardware unit runs at a second privilege level that has more privileges than the first privilege level;

a key generator to generate, by the page encryption hardware unit, an encryption/decryption key for the first physical memory address, wherein the encryption/decryption key is accessible by the second privilege level and is not accessible by the first privilege level;

a data encryptor to cause, by the page encryption hardware unit, the encrypted memory page to be stored on a memory; and a key storer to store, by the page encryption hardware unit, the encryption/decryption key in a key store, wherein the key store maps a plurality of encryption keys to a plurality of physical memory addresses including the first physical memory address.

17. The system of claim 16, wherein the first privilege level is a non-secure state and the second privilege level is a secure state.

18. The system of claim 16, the processor and the page encryption hardware unit are included in a system on a chip.

19. A system on a chip for selective memory encryption comprising:

a processor to:

receive a request to encrypt a subset of data accessed by a process, wherein a plaintext version the subset of data is not accessible by an operating system; and a page encryption hardware unit to:

receive a system call from the operating system, on behalf of the process, to generate an encrypted memory page corresponding to the subset of data, wherein the system call includes a first physical memory address, a virtual address, and a size of the virtual address;

generate an encryption/decryption key for the first physical memory address, wherein the encryption/decryption key is not accessible by the operating system, encrypt the subset of data to the physical memory address using the encryption/decryption key, and store the encryption/decryption key in a key store, wherein the key store maps a plurality of encryption keys to a plurality of physical memory addresses including the first physical memory address.

20. The system on a chip of claim 19, wherein the processor has a secure and a non-secure state, a software component of the page encryption hardware unit runs in the secure state and the operating system runs in the non-secure state.

* * * * *